Figure 1:
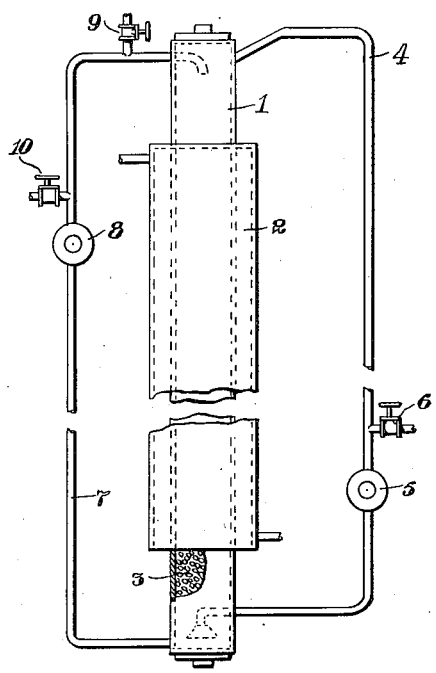

C. ELLIS.
PROCESS OF ADDING HYDROGEN TO FATTY ACIDS, FATTY ESTERS, AND OTHER UNSATURATED COMPOUNDS.
APPLICATION FILED APR. 5, 1912.

1,154,495.

Patented Sept. 21, 1915.

Attest:

Inventor:

UNITED STATES PATENT OFFICE.

CARLETON ELLIS, OF MONTCLAIR, NEW JERSEY.

PROCESS OF ADDING HYDROGEN TO FATTY ACIDS, FATTY ESTERS, AND OTHER UNSATURATED COMPOUNDS.

1,154,495.  Specification of Letters Patent. Patented Sept. 21, 1915.

Application filed April 5, 1912. Serial No. 688,814.

*To all whom it may concern:*

Be it known that I, CARLETON ELLIS, a citizen of the United States, and a resident of Montclair, in the county of Essex and State of New Jersey, have invented certain new and useful Improvements in Processes of Adding Hydrogen to Fatty Acids, Fatty Esters, and other Unsaturated Compounds, of which the following is a specification.

This invention relates to a process of adding hydrogen to fatty acids, fatty esters and similar oils and fats or other unsaturated compounds, in the presence of catalytic bodies capable of carrying hydrogen to such material, and relates in particular to a process which involves the use of what may be termed potential catalyzers such for instance as those which acquire active properties only by heating in a predetermined manner preferably in the presence of the material to be hydrogenated so as to form the catalyst *in situ*, such potential catalyzers preferably being of an oil soluble character and embracing such bodies as nickel carbonyl.

In the present invention, it is particularly the object to provide a catalytic body which is capable of being decomposed by heat in the presence of the oil to be treated and preferably likewise in the presence of hydrogen, or a hydrogen containing gas, whereby metallic nickel in a finely divided form, or even in a nascent condition is secured.

Nickel carbonyl is readily prepared by passing carbon monoxid over finely divided nickel at a temperature of 50° C. or so. This compound, as is well known, is volatile and mixes readily with gases such as carbon monoxid, or hydrogen. It is decomposed by heating to a temperature of 200° C., or even less, and when decomposed by heat under suitable conditions, the nickel is set free in a very finely divided metallic form. Nickel carbonyl is readily soluble in many oily bodies and in carrying out one modification of the present invention, this nickel compound to the extent of 1% to 2% or so, based on the weight of the oil employed, may be mixed with oil and hydrogen gas contacted with the mixture or solution, while at the same time the temperature of the oil is brought to the point of decomposition of the nickel carbonyl. The nickel is thus separated and is at least for a time in a nascent condition, acting as a catalytic body and quickly causing hydrogen to enter the oil molecule. For this purpose, ordinarily it is necessary to heat the oil to a temperature of about 200° C., to accomplish such decomposition. Nickel carbonyl usually is not as easily decomposed when diluted as when heated in the pure state. Hence the temperature employed should be determined by the speed of decomposition of the nickel carbonyl under the circumstances; that is to say both the character of the oil and the degree of dilution as well as pressure and other conditions, should be considered.

Another modification of the present invention is that of mixing the requisite amount of nickel carbonyl with hydrogen gas, or water gas, or other gas suitable for the purpose and then passing this mixture into the oil to be treated. The oil is brought to the decomposition temperature of the nickel carbonyl under these circumstances and thus the metallic nickel catalyzer is liberated in intimate contact with the hydrogen gas, thereby effecting a rapid hydrogenation of the oil. The oil may contain, if desired, finely divided solid material to serve as an attaching base for the deposited or separated nickel. In case the finely divided or colloidal nickel which forms is not, after hydrogenation, readily removed by filtration, the oil may be boiled with an aqueous acid solution to remove such nickel material.

Another modification of the present invention involves heating the oil to 180° C. or so and atomizing such oil with a mixture of hydrogen gas and nickel carbonyl. Or the nickel carbonyl may be added to the oil and the oil then atomized with hydrogen gas, the temperature being regulated for the production of the active material as above indicated. After such atomization, the oil may be passed through a heated tube or over a bed of heated fragmental material. Also, the oil may be mixed with a small amount of nickel carbonyl and caused to flow downwardly through a tower containing baffles while hydrogen gas or other gas is allowed to flow upwardly against the downwardly flowing stream of oil. The tower may be heated at one or more points so as to secure a temperature sufficient to decompose the nickel carbonyl and then, if desired, the temperature may be modified so that the mixture, on flowing through another portion of the tower is subjected to a temperature better adapted for the hydrogenation process proper. The same operation may be conducted in an inclined tube as described in Serial No. 656100, filed Oct. 23, 1911, which has matured into Letters Patent 1,026,156 of May 14, 1912, using means for differentially heating said tube.

This application is a continuation of the aforesaid Letters Patent and also of my copending application Serial No. 686,988, filed Mar. 29, 1912, as regards the thermal decomposition of metallo-organic compounds and the like to produce active material for catalytic purposes, which material may be produced in a state of almost infinite subdivision, perhaps molecular.

When carrying on the operation as a continuous process and using water gas for hydrogenation, the residual gas, depleted of its hydrogen in a large measure, may be used for preparing the nickel carbonyl compound. Nickel carbonyl may also be employed in a different way, in that it may be mixed with asbestos or fullers' earth, or other similar carrier and heated to form catalytic nickel without resorting to direct reduction of say nickel oxid by hydrogen. Such a catalytic body may then be used for treating oils in the presence of hydrogen under suitable conditions of temperature and pressure.

In the case of oleic acid or other bodies which may be converted into a vapor form, the nickel carbonyl and hydrogen may be mixed with the vapors of such bodies and passed through a heating zone, preferably being raised to a temperature of 180 or 200 degrees C., or to whatever temperature under the particular conditions of operation is required for a satisfactory decomposition of the carbonyl compound into an active body. In this case also nascent nickel is liberated in the presence of hydrogen to good advantage.

Various oils may be treated in accordance with the present invention, the unsaturated fatty acids being treated, if desired in the form of their vapors under diminished pressure. Fatty esters, such as corn and cotton seed oil, soy bean oil, fish oil, almond oil, peanut and mustard oils, castor oil, linseed and Chinese wood oils and the like are better treated in their liquid form, or sometimes in an atomized condition. As stated, it is desirable to regulate the temperature of decomposition of the nickel compound according to the particular condition of treatment, varying this according to the oil employed and the pressure of the hydrogen gas. In some cases, as indicated, it is desirable to decompose the potential catalyzer at a somewhat higher temperature than that needed for completion of the hydrogenation.

In addition to nickel carbonyl, other volatile bodies having under certain conditions potentially catalytic properties, including the corresponding compounds of iron and the like, and some of the compounds of metals with hydrocarbons, such for example as the methyl compounds of the metals, as zinc methyl and the like may be employed.

The accompanying drawings show in diagrammatic manner apparatus with which the process of the present invention may be carried out.

Figure 2:
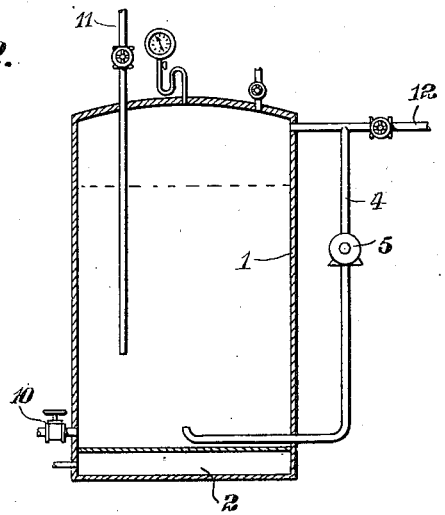

Figure 1 is a vertical elevation of a tubular or tower-like apparatus provided with means for circulating oil and gas, and Fig. 2 is a vertical section of a closed receptacle or tank having means for circulating the gas.

Like parts in the drawings are designated by like characters.

In Fig. 1, $i$ is a tube having the heating jacket 2. The tube may contain some fragmental material as shown at 3. A gas circuit is shown at 4 and interposed in this conduit is the pump 5. An inlet for hydrogen or a hydrogen containing gas is shown at 6. This also may be used for the introduction of nickel carbonyl and the like, if desired. An oil circuit is shown at 7, and interposed in this conduit is the pump 8. An oil inlet is provided at 9 and if desired the catalyzer material may be introduced through this inlet. An oil outlet or draw off is indicated at 10.

The operation is as follows: Oil in entered by 9 to fill the tube and oil conduit and is heated to the requisite temperature. Hydrogen is introduced at 6 and caused to circulate through the oil in the tube 1, entering the tube at the bottom thereof and being removed at the top. The oil circulates in an opposite direction, entering the tube at the top and being removed at the bottom as it circulates in a cyclic manner through the treating apparatus. Nickel carbonyl is entered at 9 and mixes with the oil becoming decomposed by the temperature prevailing in the apparatus, whereupon hydrogenation of the oil takes place.

In Fig. 2 the operation of the apparatus is as follows: Oil is charged into the tank 1 to fill same nearly full and the oil is heated, unless sufficiently hot when charged into the tank, until of the proper working or treating temperature. Nickel carbonyl in an amount of 1–2% or so in entered by the pipe 11. Hydrogen under pressure is introduced by the inlet 12 and the gas is caused to circulate through the oil by means of the pump 5. The nickel carbonyl is decomposed after contacting with the oil for a time and the nickel material thus liberated in a finely divided condition enables the oil to be hydrogenated with ease.

Having described my invention, to the details of which I do not wish to be limited, what I claim is 1. The process of treating organic material containing normally liquid or solid unsaturated compounds which comprises thermally decomposing a potential catalyst in contact therewith in the presence of a hydrogen-containing gas, under suitable thermal conditions, whereby hydrogen is added to said unsaturated compounds.

2. The process of treating organic material containing normally liquid or solid unsaturated compounds which comprises thermally decomposing a potential catalyst of a metallo-organic nature—whereby an active metallic body is derived—in contact there with in the presence of hydrogen, under suitable thermal conditions, whereby hydrogen is added to said unsaturated compounds.

3. The process of treating organic material containing normally liquid or solid unsaturated compounds which comprises thermally decomposing a potential catalyst of a metallo-organic nature—whereby an active metallic body in a state of extreme sub-division is derived—in contact therewith in the presence of a hydrogen-containing gas, under suitable thermal conditions, whereby hydrogen is added to said unsaturated compounds.

4. The process of treating organic material containing normally liquid or solid unsaturated compounds which comprises thermally decomposing nickel carbonyl—whereby nickel in a state of extreme sub-division is derived—in contact therewith in the presence of a hydrogen-containing gas, under suitable thermal conditions, whereby hydrogen is added to said unsaturated compounds.

5. The process of treating oily and fatty material containing unsaturated compounds which comprises thermally decomposing nickel carbonyl—whereby active nickel material in a state of extreme sub-division is derived—in contact therewith in the presence of hydrogen, whereby hydrogen is added to said unsaturated compounds.

6. The process of treating oily and fatty material containing unsaturated compounds which comprises thermally decomposing nickel carbonyl—whereby an active nickel body in a state of extreme sub-division is derived—in contact therewith in the presence of a hydrogen-containing gas, under suitable thermal conditions, whereby hydrogen is added to said unsaturated compounds.

7. The process of treating oily and fatty material containing unsaturated compounds which comprises thermally decomposing nickel carbonyl—whereby an active nickel body is derived—and in contacting said nickel body while in a nascent condition, with said material in the presence of a hydrogen-containing gas, under suitable thermal conditions, whereby hydrogen is added to said unsaturated compounds.

8. The process of treating oily and fatty material containing unsaturated compounds which comprises thermally decomposing nickel carbonyl—whereby an active nickel body is derived—in contact therewith in the presence of hydrogen under pressure and under suitable thermal conditions, whereby hydrogen is added to said unsaturated compounds.

9. A process of catalytic hydrogenation which consists in heating the substance to be hydrogenated together with a hydrogenating agent and as the sole catalytic agent a metal carbonyl.

10. A process of catalytic hydrogenation which consists in heating the substance to be hydrogenated together with a hydrogenating agent and as the sole catalytic agent nickel carbonyl.

11. A process of catalytic hydrogenation of fatty bodies which consists in bringing simultaneously into contact the hydrogenating agent, nickel carbonyl as the sole catalytic agent, and the fatty body at a temperature suitable for the hydrogenation and for decomposing the metal carbonyl.

12. Process of catalytic hydrogenation which consists in heating the substance to be hydrogenated, together with the hydrogenating agent, in the presence of a metal carbonyl at the moment of its decomposition by heat, as the sole catalytic agent.

13. Process of catalytic hydrogenation which consists in heating the substance to be hydrogenated, together with the hydrogenating agent, in the presence of nickel carbonyl at the moment of its decomposition by heat, as the sole catalytic agent.

14. A process of catalytic hydrogenation which consists in heating the substance to be hydrogenated together with a hydrogenating agent and as the sole catalytic agent, in the presence of a gaseous or vaporous metallic compound which is decomposed with liberation of metal at the temperature used.

15. The process of treating unsaturated fatty material which comprises mixing therewith nickel carbonyl and hydrogen, in proportions suitable for effecting hydrogenation of the unsaturated fatty material, decomposing the nickel carbonyl, whereby nickel in nascent condition is liberated within the unsaturated material while the same is in contact with hydrogen and subjecting the material under treatment to the joint action of the nickel and the hydrogen.

16. The process of treating unsaturated fatty material which comprises mixing therewith nickel carbonyl and a hydrogen containing gas and subjecting the mixture to heat and pressure in excess of atmospheric pressure for a considerable period of time.

17. The process of treating unsaturated fatty material which comprises mixing therewith nickel carbonyl and a hydrogen containing gas and subjecting the mixture to heat, pressure in excess of atmospheric pressure, and agitation for a considerable period of time.

18. The process of treating unsaturated fatty material which consists in bringing a hydrogen containing gas laden with nickel carbonyl into contact therewith, maintaining the temperature of the mixture above the decomposition point of the nickel carbonyl for a considerable period of time and simultaneously subjecting the mixture to pressure in excess of atmospheric pressure and agitation.

Signed at Montclair in the county of Essex and State of New Jersey, this 3rd day of April, A. D. 1912.

CARLETON ELLIS.

Witnesses:
BIRDELLA M. ELLIS,
OLIVE J. HAWTHORN.